United States Patent [19]

Pippett

[11] Patent Number: 5,120,358
[45] Date of Patent: Jun. 9, 1992

[54] GOLF PRACTICE AID

[76] Inventor: Robert J. Pippett, 1304 S. Second St., St. Charles, Ill. 60174

[21] Appl. No.: 397,867

[22] Filed: Aug. 24, 1989

[51] Int. Cl.⁵ .................. C09D 13/00; H63B 69/36
[52] U.S. Cl. ..................................... 106/19; 106/272; 273/186 D; 273/183 C; 273/186 B
[58] Field of Search ............. 106/19, 272; 273/186 D, 273/183 C, 186 B

[56] References Cited

U.S. PATENT DOCUMENTS

| | | | |
|---|---|---|---|
| 2,660,436 | 6/1950 | Grossman | 273/186 D |
| 2,735,780 | 2/1956 | Le Compte et al. | 106/19 |
| 3,081,091 | 3/1962 | Grow | 273/186 D |
| 3,101,949 | 8/1963 | Williams | 273/186 D |
| 3,754,764 | 8/1973 | Manheck | 273/186 D |
| 3,806,132 | 4/1974 | Brandell | 273/186 D |
| 4,432,551 | 2/1984 | Chen | 273/186 D |
| 4,603,862 | 8/1986 | Chen | 273/186 D |
| 4,676,508 | 6/1987 | Dilny | 273/186 D |

FOREIGN PATENT DOCUMENTS

| | | | |
|---|---|---|---|
| 12046 | 1/1977 | Japan | 273/186 D |
| 44558 | 3/1985 | Japan | 106/19 |
| 145261 | 7/1986 | Japan | 273/186 D |

Primary Examiner—William R. Dixon, Jr.
Assistant Examiner—Helene Klemanski
Attorney, Agent, or Firm—Wood, Phillips, VanSanten, Hoffman & Ertel

[57] ABSTRACT

The determination of the point of impact on a golf club face with a golf ball is facilitated through the use of a flowable chalk compound placed on the ball at the intended point of contact with the club face. The flowable chalk compound includes a homogeneous, paste-like mixture of a major proportion of a solid, finely divided pigment and a minor proportion of a grease-like material. Upon impact, the chalk compound will make a visible mark on the club head face that may be observed by the golfer.

13 Claims, 1 Drawing Sheet

GOLF PRACTICE AID

FIELD OF THE INVENTION

This invention relates to golf games, and more particularly, to a practice aid that may be utilized to assist a golfer in contacting a ball at the optimum location of a golf club head, frequently colloquially referred to as the "sweet spot".

BACKGROUND OF THE INVENTION

Golfers have long known that the location of ball-club impact on the face of a golf club materially affects the direction of travel and initial velocity of the golf ball after impact. Initial velocity, in turn, affects the distance the ball will travel. The optimum location for ball-club impact is generally centrally of the club face and has come to be known as the "sweet spot." The further the point of actual impact between the club head and the golf ball from the sweet spot, the greater the degradation in initial velocity, as well as the greater the likelihood of a misdirected ball.

In recent years, manufacturers of golf equipment have designed clubs as as to increase the size of the sweet spot, or otherwise minimize the degradation on trajectory as the point of impact moves away from the sweet spot. While this effort has unquestionably been successful, it nonetheless remains an object to make contact with the ball at the sweet spot; and failure to do so will result in a poorly directed shot and/or one with reduced distance.

By way of example, for a right-handed golfer, a ball hit off the toe of the club will frequently travel in a line to the right of the intended path of travel for a reduced distance, the degree of which is determined by the club being used, the strength of the golfer, etc. Similarly, for a right-handed golfer, a ball hit off the heel of the club frequently will be "pulled" to the left of the intended line of flight and even when that does not occur, the ball will frequently take an unusually low trajectory of shorter distance than had the ball then impacted at the sweet spot.

Balls that are hit "thin," that is, below the sweet spot, tend to take undesirably low trajectories for the club being used. Depending upon the club being used, the ball may travel a greater or lesser distance than desired in such a case. Similarly, where the ball is impacted above the sweet spot, the result is frequently a ball hit highly in the air and which will travel a far lesser distance than intended.

Because of the unquestionable connection between ball trajectory and point of impact on the club face, many efforts have been made in the past to provide a means whereby a golfer can obtain an indication of the point of contact of a club head with a ball. Upon observing the point of contact, the golfer is then supposed to make whatever adjustment might be indicated by the deviation of the point of impact from the sweet spot, and thereby correct his swing. One approach is illustrated in U.S. Pat. No. 3,081,091 issued Mar. 12, 1963 to Grow. Grow provides a ball that is filled with a finely divided pigmented material, and which includes a maze of apertures. The ball is placed so that the apertures face the club head. When the ball is impacted by the club head, a small amount of the finely divided material within the ball is forced out of the apertures as the ball is compressed by the impact, and coats the point of contact on the club head. This coating is then observed by the golfer and an appropriate correction made, if necessary.

The Grow approach has a major disadvantage in that it requires the use of a ball that is not a conventional golf ball. By the very nature of its construction, the Grow ball will not follow a trajectory like a conventional golf ball and, as a consequence, the golfer may be unable to correlate the trajectory of the ball with the point of impact on the club face. Thus, lacking the ability to make a positive correlation, the Grow system is ineffective.

Another approach is suggested by Brandell in U.S. Pat. No. 3,806,132 issued Apr. 23, 1974. Brandell provides stickers having adhesives on both sides. One of the adhesives has a light tackiness, while the other has a medium tackiness. The light tackiness side of the sticker is adhered to a golf ball at the location where a club will impact upon it. Upon being impacted by a club head, the medium tackiness adhesive overpowers the light tackiness adhesive with the result that the sticker transfers from the ball to the club face at the point of contact. This system allows the use of a conventional golf ball enabling the golfer to correlate the point of impact with trajectory, but manipulation of the sticker is inconvenient and makes the system generally undesirable.

Still another approach is suggested by Dilny in U.S. Pat. No. 4,676,508 issued Jun. 30, 1987. Dilny provides a golf ball having a permanent outer coating of polyurethane resin that includes aluminosilicate and titanium dioxide. When impacted by a club head that evidently must be formed of glass fibers or carbon fiber and a suitable binder, the ball will leave a removable deposit of its coating on the club face to provide an indication of the point of contact. While Dilny represents considerable improvement over other prior art devices, it still has a number of drawbacks. For one, it is not useable with conventional golf balls in the sense that the golf ball itself must be provided with the requisite coating, apparently during the manufacturing process, because it is permanent.

Secondly, it appears that Dilny requires the use of golf clubs that are made-up of fibrous composite material and thus would not be effective with many conventional materials utilized in the manufacture of golf club heads, such as persimmon and various metals.

The present invention is directed to overcoming the above problems.

SUMMARY OF THE INVENTION

It is the principal object of the invention to provide a new and improved golf practice aid that can be utilized to locate the point of impact of a golf ball on a golf club face, while using a conventional golf ball and which does not require any significant manipulation of the aid.

An exemplary embodiment of the invention achieves the foregoing object with a flowable chalk compound that may be placed on a golf ball at the intended point of contact with a club face, so as to be transferred thereto upon impact and thus provide an indication of the point of contact on the club face. The flowable chalk compound may be utilized with conventional golf balls and will provide the indication on golf clubs made of any of a large variety of materials. The flowable chalk compound is a homogeneous, paste-like mixture of a major proportion of a solid, finally divided pigment and a minor proportion of a grease-like material.

Optionally, the chalk compound may include an air activated hardening agent. When the agent is employed, it is typically a gum and in a highly preferred embodiment, the gum is chlorhexidine gluconate. Where used, the hardening agent makes up about 20% of the compound.

The invention contemplates that the pigment be a chalk-like substance. In one embodiment, an alumino silicate is utilized as the chalk-like substance and in a highly preferred embodiment, the alumino silicate is sodium alumino sulphosilicate.

In a preferred embodiment, the grease-like material is a petrolatum. In a highly preferred embodiment, the pigment is present in about 2 to 4 parts to about 1 part petrolatum.

In a highly preferred embodiment, about 3 parts of pigment is employed to 1 part of petrolatum.

The invention further contemplates that the flowable chalk compound be disposed in a squeeze-tube package having a removable cover on a neck with a small opening. As a consequence, the flowable chalk may be deposited in a spot on the ball simply by squeezing the squeeze tube. Other objects and advantages will become apparent from the following specifications taken in connection with the accompanying drawings.

DESCRIPTION OF THE PREFERRED EMBODIMENT

Figure 1:
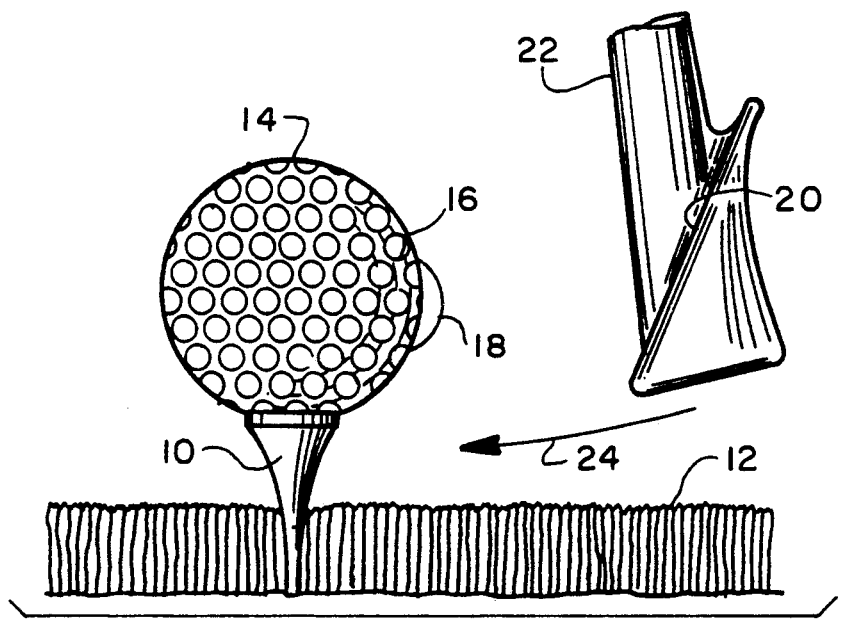
FIG. 1 is a side elevation of a golf ball provided with a flowable chalk compound made according to the invention and about to be impacted by a golf club head.

Before entering into a discussion of the specifics of the flowable chalk compound of the invention, an indication of the intended use of the material is considered appropriate. With reference to FIG. 1, a conventional golf tee 10 is disposed in the ground 12, and supports a conventional golf ball 14. However, as will be apparent hereinafter, the use of the invention is not limited to situations requiring a tee. That is to say, the invention may find use where the ball 14 is supported directly on the ground 12.

On one side 16 of the golf ball 14, a small dot 18 of the flowable chalk compound of the invention is placed on the ball 14. The side 16 is the side of the ball 14 which is to be impacted by the face 20 of a golf club 22 being swung at the ball 14 in the direction of an arrow 24. That is to say, the dot 18 is placed on the ball 14, and the ball oriented such that the club face 20 will impact the ball 14 at the dot 18.

Figure 2:
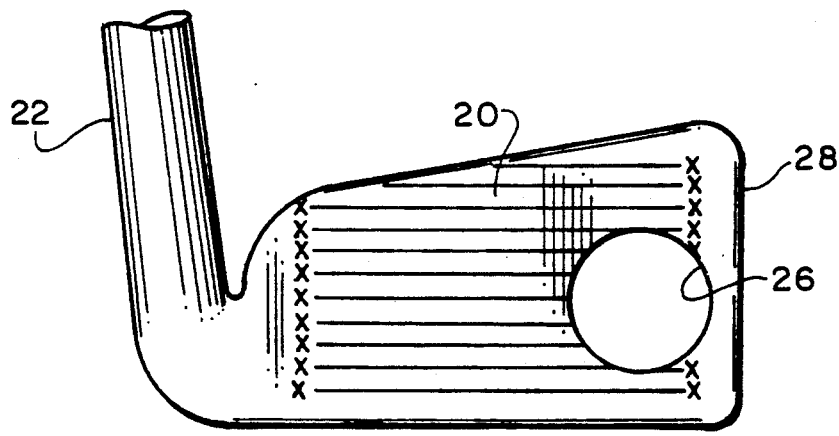
FIG. 2 is an elevational view of the face of a golf club head after it has impacted against a ball bearing the flowable chalk compound of the invention.

As a consequence of that fact, a mark 26 (FIG. 2) will be formed on the club head face 20 as the dot 18 of flowable chalk material is sandwiched between the ball 14 and the face 20 at impact. The mark 26 will be located at the point of impact on the club face 20 and, as seen in FIG. 2, is displaced from the center of the club face 20 towards the toe 28 of the club. Given that the club illustrated in FIG. 2 is a left-handed club, this type of shot would frequently result in a ball travelling lesser distance and to the left of the intended line of flight. Thus, a golfer viewing the spot 26 and, after seeing the resulting trajectory of the ball, could make an appropriate adjustment in his swing, stance, or the like, and then hit another ball, similarly provided with a dot 18, after wiping the indication 26 from the club head face 20. The procedure could be repeated for as long as desired.

Figure 3:
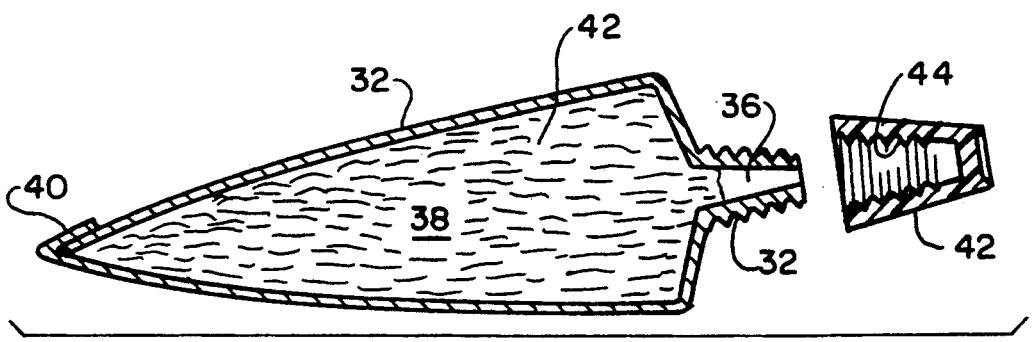
FIG. 3 is a sectional view of a package of the flowable chalk composition.

FIG. 3 illustrates a preferred form of container for the flowable chalk compound, a typical plastic squeeze tube 32 is employed and includes an exteriorly threaded neck 34 with a central, reduced size opening 36 which is in fluid communication with the interior 38 of the tube 32. Opposite the neck 34, the tube is sealed as at 40 in a conventional fashion.

A cover 42 having a threaded interior opening 44 is adapted to be threaded on the neck 34 to seal the tube 32 when desired. Within the interior 38 of the tube 32 is a quantity 42 of the flowable chalk material of which the dot 18 is formed. By removing the cover 22, and squeezing the tube 32, a small amount of the flowable chalk material may be caused to leave the opening 36 to form the dot 18 on a golf ball. The golf ball 14 may then be oriented in the manner mentioned previously.

The flowable chalk compound of the invention requires certain characteristics. Preferably, it is somewhat paste-like so that it will adhere to a golf ball 14 as the dot 18.

In addition, the material could be somewhat liquid in the sense that it (a) flows and (b) will wet surfaces with which it comes in contact, here, the club face 20 so as to provide the indication 26.

The material also must be colored or pigmented so as to provide a visible indication as the indication 26.

The material additionally should be sufficiently fluid that it may be easily wiped from the club head face 20 and yet not so fluid as to affect the application of forces by the club face 20 to the ball 14 such that the trajectory of the latter would be modified.

In the broadest sense, these attributes may be achieved in a flowable chalk-like compound that comprises a homogeneous, paste-like mixture in major proportion made up of a solid finely divided pigment or powder that will contrast with the face of a golf club and a minor proportion of a grease-like material. Optionally, the compound may include an air activated hardening agent. Use of such an agent is not necessary but may be desirable in some instances. When employed, it is desirable that the hardening agent be a gum that tends to dry or otherwise solidify when exposed to air. One type of gum that may be used for the purpose is chlorhexidine gluconate. When used, the gum makes up about 20% of the compound.

The pigment or powder is typically a chalk-like substance, though not strictly chalk in the narrow sense of the word, in that it need not be a compound that contains either calcium or carbonate ions. According to one embodiment of the invention, the substance is an alumino silicate and in a highly preferred embodiment, to provide a desirable ultramarine blue color, sodium alumino sulphosilicate is used.

The grease-like substance is preferably a pertrolatum, that is, a smooth semi-solid blend of mineral oil with waxes crystalized from the residual type of petroleum lubricating oil. Usually, the wax molecules contain 30–70 carbon atoms and are straight chains with a few branches or napthene rings. However, other types of grease-like materials may be utilized.

The specific materials mentioned previously are preferred from the standpoint that they are non-toxic. Indeed, in a preferred embodiment, it is desirable that the grease-like material utilized be such as to meet the requirement for lubricants that may be used in environments where they are likely to come into incidental contact with food. To this end, a highly preferred material is Bell-Ray No-Tox Grease AA-1 #0, Product Number 6224 available from Bell-Ray Corporation, P.O. Box 526, Farmingdale, N.J. 07727.

In the usual case, the pigment or powder will be finely divided and will be utilized in the compound at the rate of 2 to 4 parts for each part of the grease-like material. The hardening agent will be present in such a mixture at the rate of 0 to 1 part.

In a highly preferred embodiment, there will be 3 parts of power or pigment to each part of grease-like material.

From the foregoing, it will be appreciated that the use of a flowable chalk compound made according to the invention allows the use of conventional golf balls while providing the golfer with a mark or indication on the club head face of the point of impact of the same with the ball, and allowing the golfer to visually correlate the trajectory of the ball with the point of impact. It will be further appreciated that use of the compound is extremely easy, since it may be simply squeezed out of a squeeze tube to form a little dot on the ball and the ball appropriately placed on the ground or on a tee before being struck. The materials are easily wiped free from both the club head face and the golf ball, and are non-toxic.

I claim:

1. A golf practice aid comprising a flowable chalk compound that can be placed on a golf ball at the intended point of contact with a club face so as to be transferred thereto upon impact and thus provide an indication of the point of contact on the club face, the chalk compound comprising a homogeneous paste of a major proportion of a solid, finely divided pigment, and a minor proportion of a grease material.

2. The golf practice aid of claim 1 further including an air activated hardening agent.

3. The golf practice aid of claim 2 wherein said agent is a gum.

4. The golf practice aid of claim 3 wherein said gum is chlorhexidine gluconate.

5. The golf practice aid of claim 2 wherein said agent makes-up about 20% of the compound.

6. The golf practice aid of claim 1 wherein said pigment is a chalk-like substance.

7. The golf practice aid of claim 6 wherein said chalk substance is an alumino silicate.

8. The golf practice aid of claim 7 wherein said alumino silicate is sodium alumino sulphosilicate.

9. The golf practice aid of claim 1 wherein said grease material is a petrolatum.

10. The golf practice aid of claim 9 wherein said pigment is present in an amount on the order of three times the amount of petrolatum.

11. A golf practice aid comprising a flowable chalk compound that can be placed on a golf ball at the intended point of contact with a club face so as to be transferred thereto upon impact and thus provide an indication of the point of contact on the club face, the chalk compound comprising a homogeneous paste mixture of about 2 to 4 parts of a solid, finely divided powder and about 1 part petrolatum.

12. The golf practice aid of claim 11 wherein said powder is pigmented.

13. A golf practice aid comprising a flowable chalk compound that can be placed on a golf ball at the intended point of contact with a club face so as to be transferred thereto upon impact and thus provide an indication of the point of contact on the club face, the chalk compound comprising a homogeneous paste mixture of about 3 parts of a solid, finely divided powdered pigment, about 1 part of petrolatum and about 0 to 1 part of a hardening agent.

* * * * *